Figure 1:
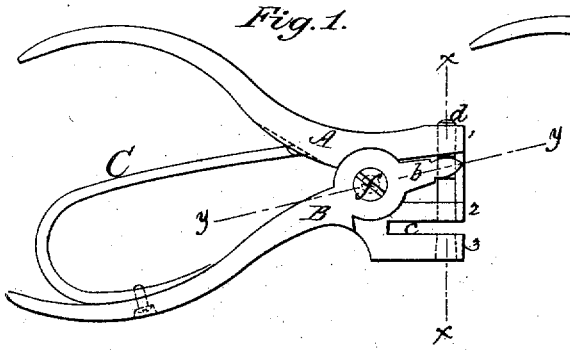

A. L. ECKERT.

Hand-Punches.

No. 5,450. Reissued June 17, 1873.

Witnesses.
John Tyler.
R. F. Whitlesey

Andrew L. Eckert, Inventor.
By Atty. Am. C. W. Seton

UNITED STATES PATENT OFFICE.

ANDREW L. ECKERT, OF NEWARK, N. J., ASSIGNOR TO WILLIAM F. EBBS.

IMPROVEMENT IN HAND-PUNCHES.

Specification forming part of Letters Patent No. 53,282, dated March 20, 1866; reissue No. 5,450, dated June 17, 1873; application filed April 19, 1873.

*To all whom it may concern:*

Be it known that I, ANDREW L. ECKERT, of Newark, in the county of Essex and State of New Jersey, have invented an Improved Hand-Punch, of which the following is a specification:

My invention relates to what are known as railroad-ticket punches. It has for its object to render them more accurate in their work, less liable to wear by friction, or become broken by careless use and undue strain; and, also, to render the handle or lever-spring capable of use as a suspension-ring; and to these ends my invention consists, first, in forming the main jaw with three prongs, through which the punch moves and operates, as will be presently more fully explained; second, in forming one jaw of a punch, irrespective of any other feature, with a slot adapted to prevent the introduction of such a size or number of tickets as might induce to a straining or breakage of the instrument, as will be more fully set forth; third, in pivoting the spring-lever or jaw within the other so that its interior or contact face shall have a horizontal bearing throughout the whole extent of its seat, the arm thereof limited in its movement by abutting against the two shoulders of the seat, as will be hereinafter more fully set forth; fourth, in the combination of the reciprocating slotted cutting-die with the spring-lever or jaw, so that the former may be replaced or repaired readily and without affecting the other, as will be hereinafter set forth; fifth, in so constructing and arranging the spring, which presses apart or keeps open the handles, that it shall serve also as a ring, upon which the punch may be swung, to the finger of the operator when not in use, as will be more fully explained.

Previous to my invention various improvements have been suggested, and many patents granted having for their objects to render hand or railroad-ticket punches simple and effective; but none of them, so far as I am aware, have proved perfectly successful. Those which have been most universally adopted consist of a pair of simple levers, pivoted upon the fashion of shears, one having a male and the other a female die, which approach each other and cut when brought into actual contact. The distance between the dies is, of course, regulated solely by the size of the instrument and the distance the levers move, and, consequently, a very large number of tickets may be inadvertently or carelessly placed between the jaws, and the attempt to punch them result in damage or breakage of the punch. This is the chief disadvantage. Another is the uneven wear at the pivot, which induces to a wabbling at that point and a consequent misdirection of the cutting-end of the punch, which results in the defacement of or cutting the edges of the male or female die or both of them, which, in a short time, would utterly impair the usefulness of the instrument; and, again, in this sort of punch, it is necessary to provide some sort of spring "stripping" device, which adds materially to the labor and cost. The male die cannot be taken out for repair or replacement readily and at slight expense, as in my improved punch, and some sort of hanging-ring must be provided by which to temporarily suspend the punch to the finger of the conductor when it becomes necessary for him to use both hands for any purpose.

All these difficulties are effectually overcome by my invention, and a punch produced which is simple and economic in construction, not likely to get out of repair, and almost impossible to break in legitimate use.

To enable those skilled in the art to more fully understand its construction and advantages, I will proceed to describe the same, referring by letters to the accompanying drawing, in which—

Figure 2:
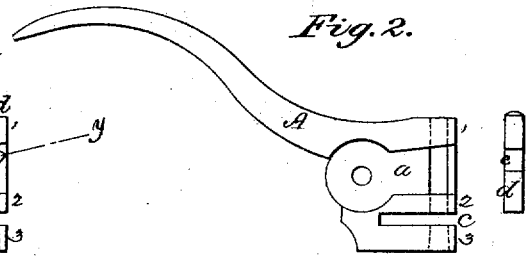
Figure 2:
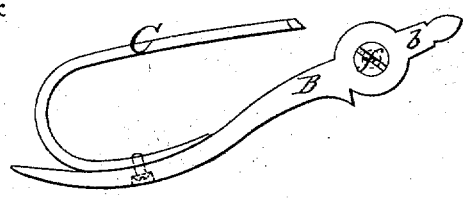
Figure 3:
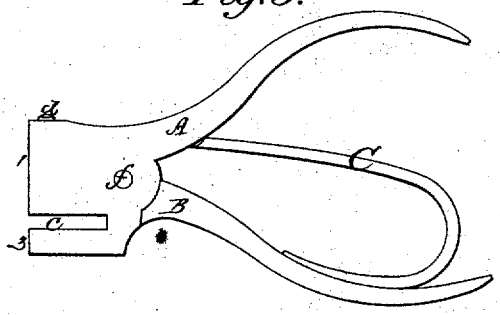
Figure 4:
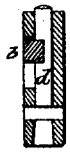
Figure 5:
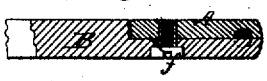

Figure 1 is a plan view; Fig. 2, a similar view with the parts disconnected; Fig. 3, a view of the reverse side of the punch as shown at Fig. 1; Fig. 4, a section at the line *x x*, Fig. 1; and Fig. 5, a transverse section at the line *y y* of Fig. 1.

Similar letters denote like parts in the several figures.

A represents the slotted, and B the spring, jaw or lever. The former, A, is recessed or cut away, as seen at *a*, to form a seat to receive the other, B, and admit of the necessary vibration of the end or arm *b* thereof. The jaw A has also a slot, *c*, cut entirely through, so that, as seen at Fig. 1, three prongs, 1 2 3, are formed, while on the reverse side, as seen at Fig. 3, but two are seen. These prongs are adapted to receive the cutting-punch *d*, as clearly shown, and numbers 1 and 2 furnish a constant double bearing, and at either side of the power, for the punch *d*, so that the same is always properly guided to the female die or hole in the lower one, 3, thus positively preventing the cutting away or defacement of the edges of either of the dies. The punch or die *d* is slotted or cut away, as seen at *e*, to receive the end of the arm *b*, by which it is forced down when the handles approach, or raised up when through the medium of the spring they are opened. The extreme end of the arm *b* is curved or cam-faced to compensate for the change from vibratory to reciprocatory motion.

The slot *c*, embraced between the prongs 2 and 3, serves as the guide and receptacle for the ticket to be punched, and its width will determine whether more than one, and how many, tickets may be introduced; and hence a guard against the breakage of the instrument is thus provided.

When the punch *d* has performed its work the bottom face of the arm *b* comes in contact with the upper shoulder of the prong 2 and the punch is relieved of further strain.

Both jaws are secured or pivoted together by a screw, *f*, and are forced or held apart by the action of a spring, C, one end of which is secured by a rivet or screw to the lever A and the other resting in a fluting on the inside of of the lever B, the spring being so shaped as to form a ring by which the instrument may be suspended to the finger of the conductor.

I do not wish to be limited to the precise details of construction shown, as they may be varied without departing from the spirit of my invention; nor do I wish to be limited to the use of the ticket-slot in a punch embracing the other characteristics described, for it may be advantageously employed in a large variety of ticket-punches now in use and embodying no other feature of my invention; but Having described the construction, &c., of my improved punch, what I claim as new, and desire to secure by Letters Patent, is—

1. A ticket-punch, one jaw of which forms three prongs, substantially as shown and described, wherein the punch or male die is held and guided, substantially as and for the purposes set forth.

2. A ticket-punch, one jaw of which is slotted, substantially as shown, to receive the ticket to be punched, as hereinbefore set forth.

3. A ticket-punch, the spring-jaw of which is located within and pivoted to the other, substantially in the manner and for the purposes set forth.

4. The combination of a spring-lever with an independent reciprocating die, substantially as and for the purposes set forth.

5. The spring for keeping apart the handles, arranged to serve also the purposes of a suspension-ring, as set forth.

Witness my hand and seal this 28th day of March, 1873.

ANDREW L. ECKERT. [L. S.]

Witnesses:
JOSEPH H. BRUEN,
ADAM HERZINGER.